United States Patent
Hong et al.

(10) Patent No.: US 6,830,689 B2
(45) Date of Patent: Dec. 14, 2004

(54) PROCESS FOR REMOVING PHOSPHORUS FROM WASTEWATER UTILIZING A TRIPLE BASIN WASTEWATER TREATMENT SYSTEM

(75) Inventors: Sun-Nam Hong, Cary, NC (US); Hong W. Zhao, Raleigh, NC (US); Richard W. DiMassimo, Raleigh, NC (US)

(73) Assignee: United States Filter Corporation, Palm Desert, CA (US)

( * ) Notice: Subject to any disclaimer, the term of this patent is extended or adjusted under 35 U.S.C. 154(b) by 3 days.

(21) Appl. No.: 10/429,556

(22) Filed: May 5, 2003

(65) Prior Publication Data

US 2004/0222150 A1 Nov. 11, 2004

(51) Int. Cl.$^7$ ................................................. C02F 3/30
(52) U.S. Cl. ........................ 210/605; 210/623; 210/630; 210/906
(58) Field of Search ................................. 210/605, 620, 210/621, 622, 623, 629, 630, 903, 906

(56) References Cited

U.S. PATENT DOCUMENTS

| | | |
|---|---|---|
| 4,260,486 A | 4/1981 | Reid |
| 4,460,471 A | 7/1984 | Reid |
| 4,643,830 A | 2/1987 | Reid |
| RE32,429 E | 6/1987 | Spector |
| 4,678,375 A | 7/1987 | Gagle et al. |
| 4,948,510 A | 8/1990 | Todd et al. |
| 5,137,636 A | 8/1992 | Bundgaard |
| 5,213,681 A | 5/1993 | Kos |
| 5,228,996 A * | 7/1993 | Lansdell ................. 210/605 |
| 5,288,405 A | 2/1994 | Lamb, III |
| 5,536,407 A | 7/1996 | Petersen |
| 5,603,833 A | 2/1997 | Miller |
| 5,650,069 A | 7/1997 | Hong et al. |
| 5,667,688 A | 9/1997 | Kerrn-Jespersen et al. |
| 5,902,484 A * | 5/1999 | Timpany ................. 210/621 |
| 5,908,554 A | 6/1999 | Tholander et al. |
| 6,096,214 A * | 8/2000 | Ripley .................... 210/603 |
| 6,235,196 B1 | 5/2001 | Zhou et al. |
| 6,238,562 B1 | 5/2001 | Nielsen et al. |
| 6,290,849 B1 | 9/2001 | Rykaer et al. |
| 6,325,933 B1 | 12/2001 | Nielsen et al. |
| 6,383,371 B1 * | 5/2002 | Ripley .................... 210/120 |

FOREIGN PATENT DOCUMENTS

DE 3833009 A1 * 4/1990

* cited by examiner

Primary Examiner—Fred G. Prince
(74) Attorney, Agent, or Firm—Coats & Bennett, P.L.L.C.

(57) ABSTRACT

A multi-phase process for removing phosphorus from wastewater in a triple ditch or triple basin system where wastewater influent is sequentially directed to each of the three basins or ditches, sometimes referred to as first and second outer basins and an intermediate basin. During each phase of the process, the mixed liquor in at least one of the basins is subject to settling. In one or more phases of the process, the mixed liquor, in certain basins, is subjected to anaerobic and aerobic treatment. Anaerobic treatment results in the growth or proliferation of phosphorus storing microorganisms. These phosphorus-storing microorganisms take up phosphorus when the mixed liquor is subjected to aerobic conditions. One of the basins, the intermediate basin, can be designed to have a volume greater than either of the first or second outer basins. Further, the triple basin or triple ditch system is designed to transfer mixed liquor suspended solids or biomass from one basin to another. Each outer basin is provided with a submersible pump that is operatively connected to a network of pipes such that mixed liquor suspended solids can be transferred from each of the first and second outer basins to the intermediate basin. Further, mixed liquor suspended solids can be transferred back and forth between the two outer basins.

22 Claims, 4 Drawing Sheets

US 6,830,689 B2

PROCESS FOR REMOVING PHOSPHORUS FROM WASTEWATER UTILIZING A TRIPLE BASIN WASTEWATER TREATMENT SYSTEM

FIELD OF INVENTION

The present invention relates to processes and systems for treating wastewater and more particularly to a process for removing phosphorus from wastewater utilizing a triple oxidation ditch system.

BACKGROUND OF THE INVENTION

For many years, ditch processes have been used to treat wastewater. One of the most successful ditch processes known is the Triple Ditch Process. The Triple Ditch Process is particularly known for its ability to perform controlled removal of nitrogen. This process and system differs from conventional activated sludge nitrification and denitrification processes in that it includes no recycle stream or external clarifier. The Triple Ditch system includes three hydraulically interconnected oxidation ditches that alternatively function as aerobic (oxic), anoxic, or quiescent reactors. The aerobic or oxic reactor performs the nitrification. The anoxic reactor performs denitrification. The quiescent reactor performs clarification. Because the flow direction through the oxidation ditches is periodically reversed, there is no need to provide for internal recycle streams or the pumping of return activated sludge. The major advantage of the Triple Ditch system is that it consistently produces a high quality effluent at a significant lower cost than conventional systems.

As noted above, the Triple Ditch Process is effective for nitrogen removal as well as the removal of BOD and suspended solids. However, in many situations it is desirable to remove another nutrient—phosphorus. It is, of course, possible to remove phosphorus from wastewater through either chemical means or biologically. There are many disadvantages to using chemicals, not the least of which is cost. Conventional biological phosphorus removal (BPR) usually entails a series of reactors, an external clarifier, and a pumping system for pumping activated sludge from the external clarifier to the front or initial reactor. See, for example, U.S. RE 32,429, the disclosure of which is expressly incorporated herein. Such conventional wastewater treatment systems require large capital expenditures and are expensive to operate and maintain. In many situations, the cost of a conventional phosphorus removal system is cost prohibitive.

Therefore, there has been and continues to be a need for a cost effective and efficient biological wastewater treatment system that will remove phosphorus.

SUMMARY OF THE INVENTION

The present invention entails a multi-phased process for removing phosphorus from wastewater in a triple ditch or basin wastewater treatment facility. In one or more phases of the process, wastewater influent is directed into one of the basins and mixed with activated sludge to form mixed liquor. The mixed liquor in the basin is maintained under anaerobic conditions. Mixed liquor effluent from this basin is directed to the other basins in the facility. In succeeding phases, the wastewater influent is initially directed into other basins. Throughout the phased process, the mixed liquor in various basins is maintained under anaerobic and aerobic conditions while one or more of the basins is used for settling. Anaerobic treatment of the mixed liquor gives rise to the growth of phosphorus storage microorganisms and these phosphorus storage microorganisms take up phosphorus when exposed to aerobic conditions.

In one particular embodiment of the process, the three ditches or basins are referred to as two outer basins and one intermediate or middle basin. In order to balance the biomass in the process and to enhance the efficiency of the process, the wastewater system is provided with a piping network that enables the biomass to be transferred from either or both of the two outer basins to the intermediate basin, or permits the biomass to be transferred back and forth between the two outer basins.

Additionally, in one particular embodiment of the present invention, the volume of the three basins is not equal. In such a design, the volume of the intermediate basin exceeds the volume of either of the two outer basins, and in one particular embodiment the volume of the intermediate basin constitutes as much as 50% of the total volume of all three basins.

Other objects and advantages of the present invention will become apparent and obvious from a study of the following description and the accompanying drawings, which are merely illustrative of such invention.

DESCRIPTION OF EXEMPLARY WASTEWATER TREATMENT SYSTEM AND PROCESS

Figure 1:
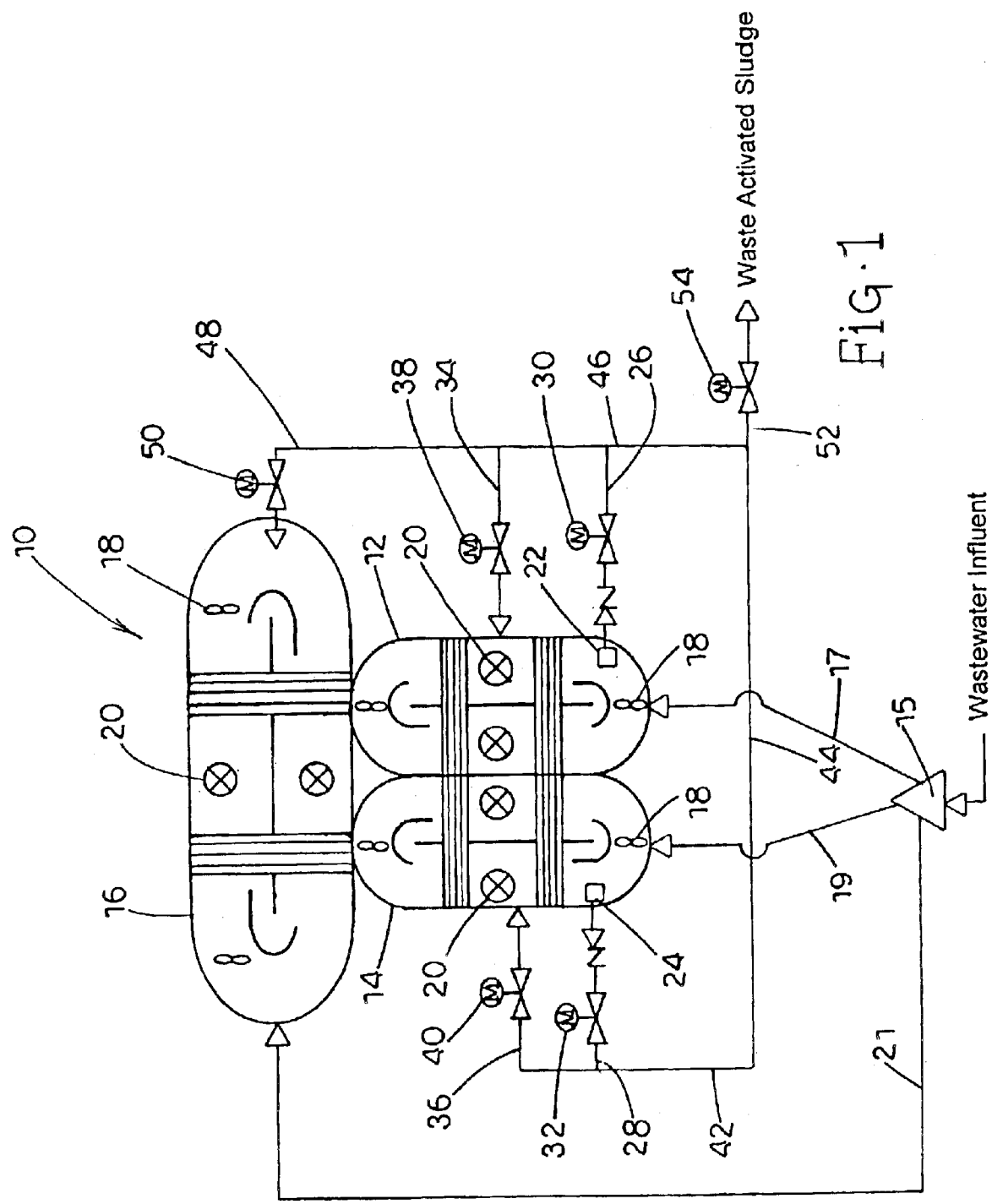
FIG. 1 is a schematic illustration of the triple ditch or basin wastewater treatment facility of the present invention.

With further reference to the drawings, particularly FIG. 1, a triple ditch or triple basin wastewater treatment system is shown therein and indicated generally by the numeral 10. Viewing triple basin system 10 in more detail, it is seen that the same includes two outer basins 12 and 14 and a middle or intermediate basin 16. As with conventional wastewater treatment systems, each of the basins is provided with one or more mixers 18 and one or more aerators or rotors 20. As will be fully appreciated from subsequent portions of this disclosure, the triple basin system 10 is designed to receive wastewater influent for treatment. Typically wastewater influent is directed to a distribution box 15. Extending from the distribution box is a series of lines, 17, 19 and 21. As seen in FIG. 1, line 17 leads from the distribution box 15 to the outer basin 12. Line 19 leads from a distribution box 15 to the other outer basin 14. Finally, line 21 leads from the distribution box 15 to the intermediate basin 16. Thus the wastewater influent stream can be directed into outer basin 12, outer basin 14, or intermediate basin 16.

Once the wastewater stream is directed into a particular basin, the wastewater is mixed with activated sludge to form mixed liquor. The mixed liquor can flow from outer basin 12 to intermediate basin 16 and then to outer basin 14, and vice versa. Mixed liquor flowing from one basin to another generally flows through sluice gates formed in common walls that extend between the respective basins. The direction of flow through the basins is typically controlled by motor operated adjustable effluent weirs, which change the hydraulic gradient by raising to stop discharge, or lowering to allow discharge. The treated effluent will exit certain basins by flowing over the motorized adjustable effluent weirs.

In the example illustrated in FIG. 1, the volume of the intermediate basin 16 is larger than the volume in either outer basin 12 or outer basin 14. In some designs, the volume of the intermediate basin 16 can constitute approximately 35% to 50% of the overall system volume. Since the outer basins 12 and 14 in many phases will be utilized for settling, the increased volume for the intermediate basin 16 will tend to maximize the active volume of the system for biological reactions, especially nitrification and other processes such as BOD removal and phosphorus uptake that rely on significant aerobic conditions.

During certain phases of particular wastewater treatment processes, it may be desirable to transfer mixed liquor suspended solids between the respective basins. In order to accommodate that provision, there is provided a flow network or piping system that interconnects the respective basins 12, 14 and 16. Viewing FIG. 1, it is seen that the two outer basins 12 and 14 are provided with submersible pumps 22 and 24. Submersible pump 22 is connected to an outlet line 26 that leads to a control valve 30. Submersible pump 24 is connected to an outlet line 28 that leads to a control valve 32. Further, there is provided an inlet line 34 that is operatively connected to a control valve 38. As seen in FIG. 1, inlet line 34 leads into the outer basin 12. Likewise, there is provided an inlet line 36 and associated control valve 40 where inlet line 36 leads to the other outer basin 14. There is also provided a series of connecting lines 42, 44 and 46 that effectively connect the outlet lines 26 and 28 as well as the inlet lines 34 and 36. Also operatively connected in the flow network is an inlet line 48 that is directed into the intermediate basin 16. A control valve 50 is associated with inlet line 48 for controlling the flow of mixed liquor suspended solids into the intermediate basin 16.

Finally, operatively associated with the flow network is a waste activated sludge line 52. Waste activated sludge line 52 includes a control valve 54 associated therewith.

Flow of mixed liquor suspended solids between the basins 12, 14 and 16 can be controlled in various ways. For example, the submersible pumps 22 and 24 and the various control valves 30, 32, 38, 40 and 50 can be controlled through a PLC based on the process being performed and the conditions being experienced in the various basins.

In the process for removing phosphorus to be described subsequently herein, reference will be made to certain operating conditions such as anaerobic, anoxic and aerobic. The term "anaerobic" for the purpose of the present application is defined as the state existing within a sewage treating zone which is substantially free of nitrates and nitrites ($NO_x$), that is less than 0.3 ppm and preferably less than 0.2 ppm expressed as elemental nitrogen, and wherein conditions are maintained such that the dissolved oxygen concentration (DO) is less than 0.7 ppm and preferably less than 0.4 ppm. The term "anoxic" as employed herein is defined as the condition existing within a sewage treating zone wherein BOD is metabolized by nitrates and/or nitrites in initial total concentrations higher than about 0.5 ppm expressed as nitrogen, and dissolved oxygen is less than 0.7 ppm, preferably less than 0.4 ppm. "Aerobic" is used herein to mean the state existing within a sewage-treating zone where conditions are maintained such that the DO concentration is 1.0 ppm or above. Although not strictly required, in preferred situations, in aerobic conditions, air will be supplied by, for example, aerators.

Before discussing the phosphorus removal process of the present invention it may be beneficial to briefly describe the general and known mechanism by which phosphorus is biologically removed from wastewater. While many organisms use some phosphorus is their metabolism, some are capable, in the presence of dissolved oxygen or nitrates, of taking up and storing excessive phosphorus as complex polyphosphates. Other organisms commonly found in activated sludge systems, do not have this capability. The basic approach in designing and operating biological phosphorus removing systems is to create conditions that favor the growth of the phosphorus accumulating types of organisms. When they are removed from the system through sludge waste, their higher phosphorus content indicates that they are effective in the removal of phosphorus.

Under anaerobic conditions, the desired phosphorus storing microorganisms can assimilate simple organic compounds, such as acetates, and satisfy their energy needs by decomposing stored polyphosphates and releasing soluble orthophosphates. According to such biological phosphorus removing processes, sludge and incoming wastewater are mixed without adding oxygen, producing anaerobic conditions, which generally are conditions as described above. Microorganisms that contain stored phosphates absorb organics from the mixed liquor using the energy stored in polyphosphate bonds. In subsequent aerobic conditions, these organisms utilize the stored organic carbon for growth. Other types of organisms in the system are handicapped or impaired because they generally require oxygen or nitrates in their metabolic reactions. This gives the phosphorus-storing microorganisms the first opportunity to use the food and that advantage increases their population share in the system. In some cases, the anaerobic basin is referred to as a selector since the basin operating under anaerobic conditions effectively selects microorganisms that are capable of taking up excessive amounts of phosphorus.

Figure 2:
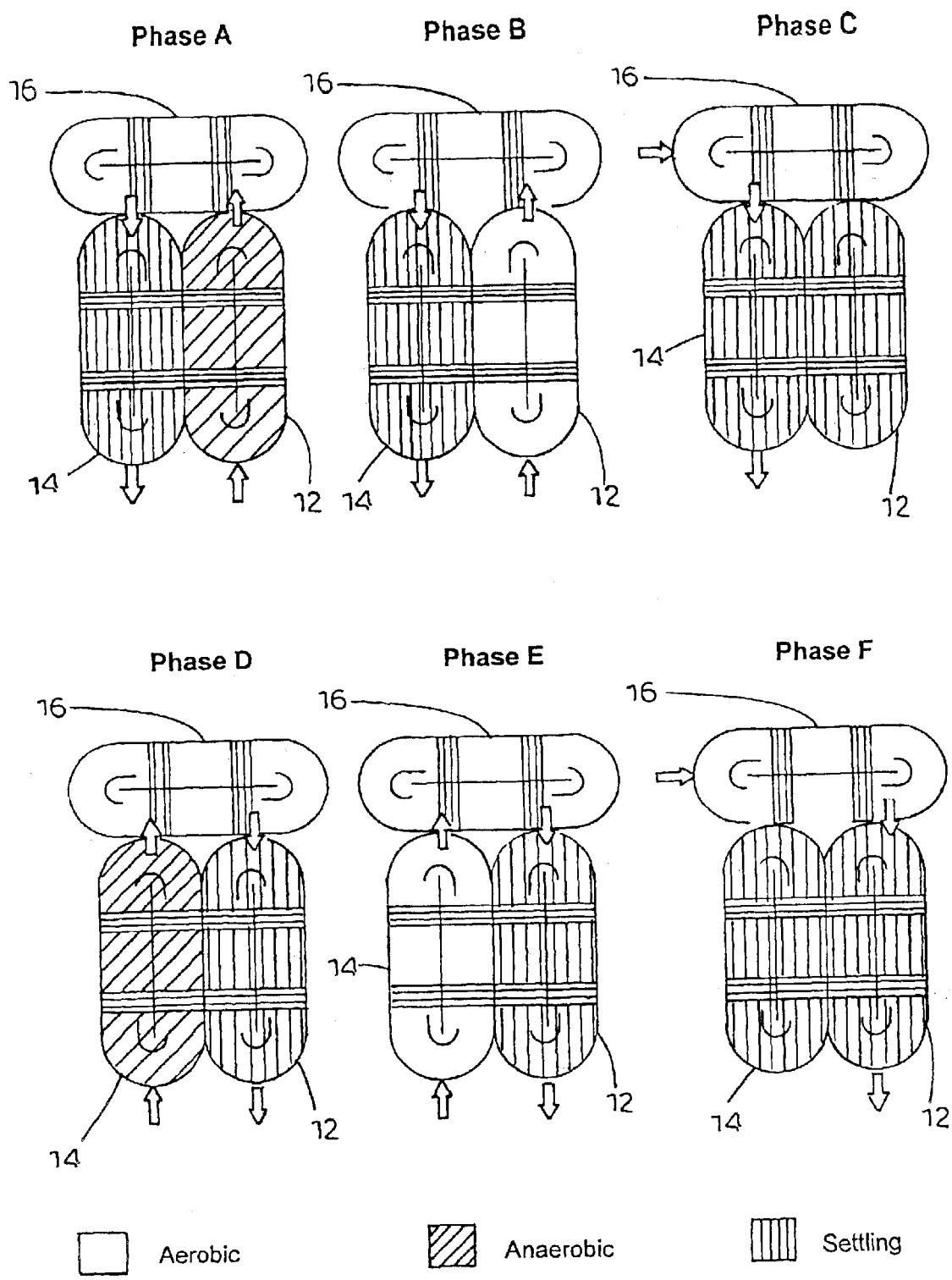
FIG. 2 is a schematic illustration of the multi-phase process of the present invention for removing phosphorus from wastewater.

Turning to FIG. 2, there is shown therein a schematic illustration showing a multi-phased biological wastewater treatment process effective to remove phosphorus from the wastewater. This process is carried out in a triple ditch or triple basin wastewater treatment facility of the type illustrated in FIG. 1 and discussed above. in the process of FIG. 2, wastewater treatment and clarification are carried out in a batch-type operation. However, influent flow to the basins and effluent discharge is continuous.

In this example, the multi-phase process includes six phases, phases A–F. In phase A, wastewater influent is directed into outer basin 12. Mixers 18 in basin 12 are activated causing the wastewater influent to be mixed with activated sludge to form mixed liquor in basin 12. Basin 12, in phase A, is maintained under anaerobic conditions. In particular, wastewater influent is directed into basin 12 via the automatic influent weirs. The effluent weirs of basin 12 are raised producing a hydraulic gradient that forces the mixed liquor from the outer basin 12 to intermediate basin 16. This forces the mixed liquor to continue to the other outer basin 14 which is maintained in a settling mode and therefore result in the biosolids settling. In phase A the intermediate basin 16 is maintained under aerobic conditions and the mixed liquor therein is generally mixed by the mixer or mixers 18 therein, or one or more aerators alone could mix the mixed liquor. In order to achieve aerobic conditions, the aerator 20 disposed in the intermediate basin 16 would also be activated. The treatment time for phase A can vary, but generally it is contemplated that phase A treatment time would range from approximately 30 to 120 minutes and would, in a preferred process, continue for a time period of approximately 60 minutes.

After phase A treatment has been completed, the process moves to phase B, again illustrated in FIG. 2. Phase B is similar to phase A except the conditions in outer basin 12 are changed from anaerobic to aerobic. Essentially this only entails activating the aerators 20 in outer basin 12 to promote aerobic conditions. The mixed liquor in outer basin 12 could continue to be mixed by one or more mixers 18. However, mixing may not always be necessary. The conditions in the remaining basins, 14 and 16 remain the same and like phase A, phase B would produce a treated or purified effluent from the outer basin 14 while the biosolids therein would settle and assume a position in the lower portion of the outer basin 14. In phase B, the time period for treatment can vary. It is contemplated that the time period could range from approximately 30 to 120 minutes, and in one particular process it is contemplated that the time period would preferably be approximately 120 minutes.

After completion of phase B treatment, the process moves to phase C where there are significant changes made in the process. The automatic controlled influent weirs are adjusted to change the flow of influent wastewater from outer basin 12 to intermediate basin 16. The effluent weirs are adjusted such that there is a hydraulic gradient existing from intermediate basin 16 to outer basin 14. Therefore, mixed liquor from intermediate basin 16 is directed to outer basin 14. Here outer basin 14 remains in a settling mode. Further, outer basin 12 is now controlled such that it also assumes a settling mode. That is, in phase C there is no mixed liquor entering outer basin 12 and there is no mixed liquor or partial effluent leaving outer basin 12. But again, both outer basins 12 and 14 are maintained in a settling mode. The time period for phase C treatment can vary, but in one contemplated process it is envisioned that the time period could range from approximately 30 to 60 minutes and in one particular process the time period for treatment would be approximately 60 minutes.

From phase C, the process moves to phase D. In phase D the wastewater influent is directed into outer basin 14. There the wastewater influent is mixed with activated sludge and maintained under anaerobic conditions. Intermediate basin 16 remains under aerobic conditions. Outer basin 12 assumes a settling mode, but now, purified or treated effluent is directed therefrom. The effluent weirs are adjusted such that the flow of mixed liquor is reversed from that shown in phase A, meaning that the mixed liquor flows from outer basin 14 to intermediate basin 16 and therefrom to the outer basin 12. The time duration for phase D treatment would generally parallel that of phase A treatment.

Phase E treatment follows and this phase of the process is similar to phase D treatment except that the conditions in the outer basin 14 are changed from anaerobic to aerobic. Essentially this entails actuating the aerators 20 within the outer basin 14. The flow of mixed liquor through the basins in phase E is the same as that referred to in phase D.

Now moving to phase F, the influent wastewater stream is now moved from outer basin 14 to intermediate basin 16. Intermediate basin 16 is maintained under aerobic conditions and the effluent weirs are adjusted such that the mixed liquor from intermediate basin 16 flows into the outer basin 12 which is maintained in a settling mode and produces a treated or purified effluent. In phase F, outer basin 14 is changed from aerobic conditions to a settling mode. However, in phase F, the outer basin 14 is maintained in a simple settling mode with no purified effluent passing therefrom. The treatment time for phase F generally parallels the treatment times discussed above for phase C.

As indicated in FIG. 2, the outer basin 12 in phase A and the outer basin 14 in phase D maintain the mixed liquor therein under anaerobic conditions. This condition effectively selects phosphorus-storing microorganisms. In both phases A and D, the downstream basin from the anaerobic basin is maintained under aerobic conditions. Here the selected phosphorus-storing microorganisms take up excessive amounts of phosphorus. In addition, succeeding phases, such as phases B and E, have two of the three basins maintained under aerobic conditions. This provides additional opportunity for the selected phosphorus-storing microorganisms to take up phosphorus.

In addition, the process discussed above and shown in FIG. 2 also performs nitrification. As those skilled in the art will understand and appreciate, nitrification occurs in those basins where the mixed liquor is maintained under aerobic conditions.

In discussing the process of FIG. 2, basins 12 and 14 are both said to be in a settling mode in phases C and F. While this is technically accurate, it should be noted that there may be some differences in the two basins. Basin 14 in phase C and basin 12 in phase F are in a settling mode and are producing an effluent. Some settling takes place in basin 12 of phase C and basin 14 of phase F, but in both cases, there is no effluent being produced. Further, in subsequent phases of the process, basin 12 of phase C and basin 14 of phase F will produce an effluent. Therefore, it may also be appropriate to refer to basin 12 of phase C and basin 14 of phase F as being in a "preparing-to-settle" mode. However, for purposes of explanation, both basins 12 and 14 in phases C and F, and like phases to be discussed hereafter, are referred to as being in a settling mode.

Table 1, appearing below, summarizes the time periods for treatment for the six phase process discussed above.

TABLE 1

| Phase | Typical Range of Treatment Times (minutes) | Preferred Time (minutes) |
|---|---|---|
| A | 30–120 | 60 |
| B | 30–120 | 120 |
| C | 30–60 | 60 |
| D | 30–120 | 60 |
| E | 30–120 | 120 |
| F | 30–60 | 60 |

Figure 3A:
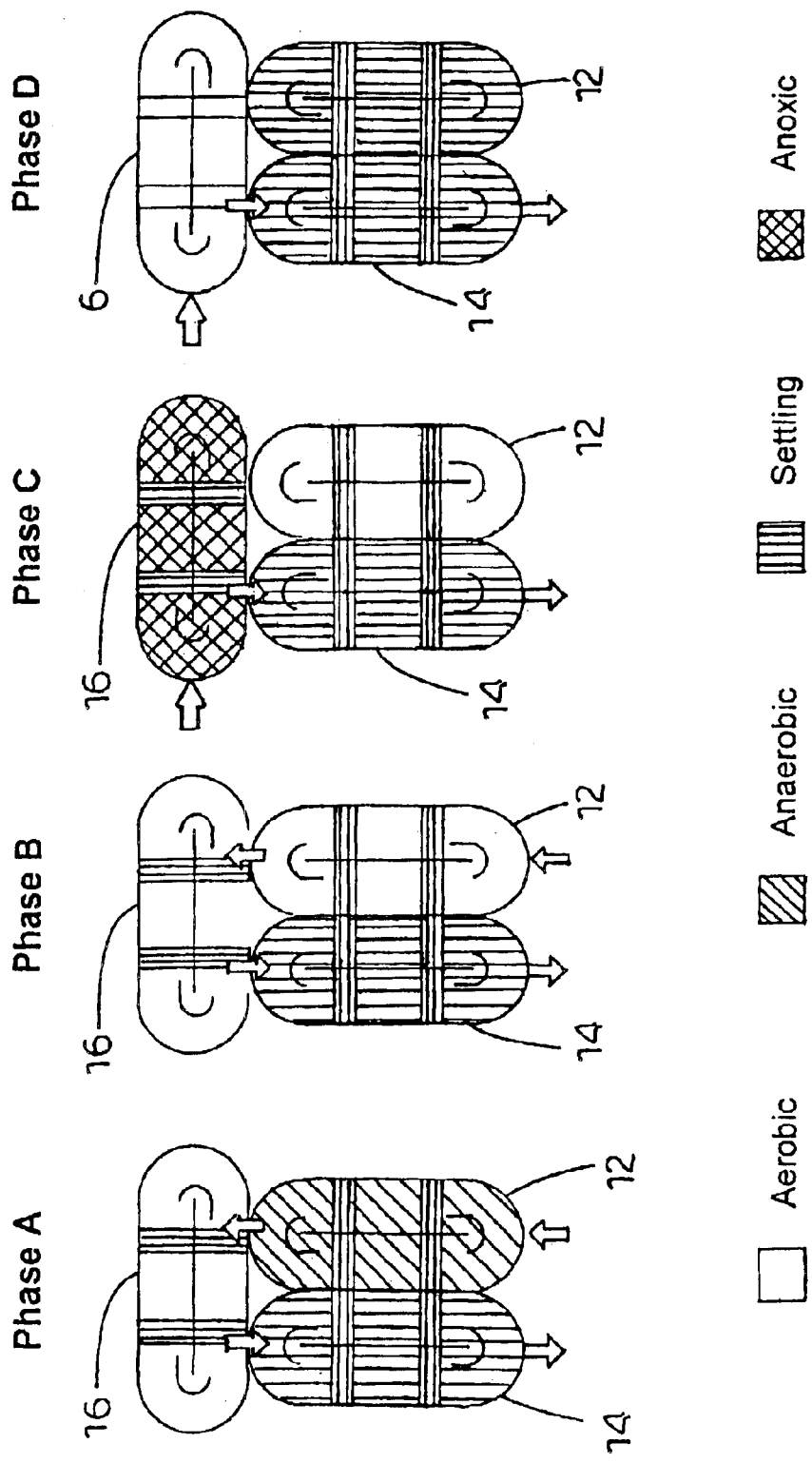
FIGS. 3A and 3B are schematic illustrations of an alternate process, similar to that shown in FIG. 2, except that the process is modified to carry out nitrification and denitrification in addition to phosphorus removal.
Figure 3B:
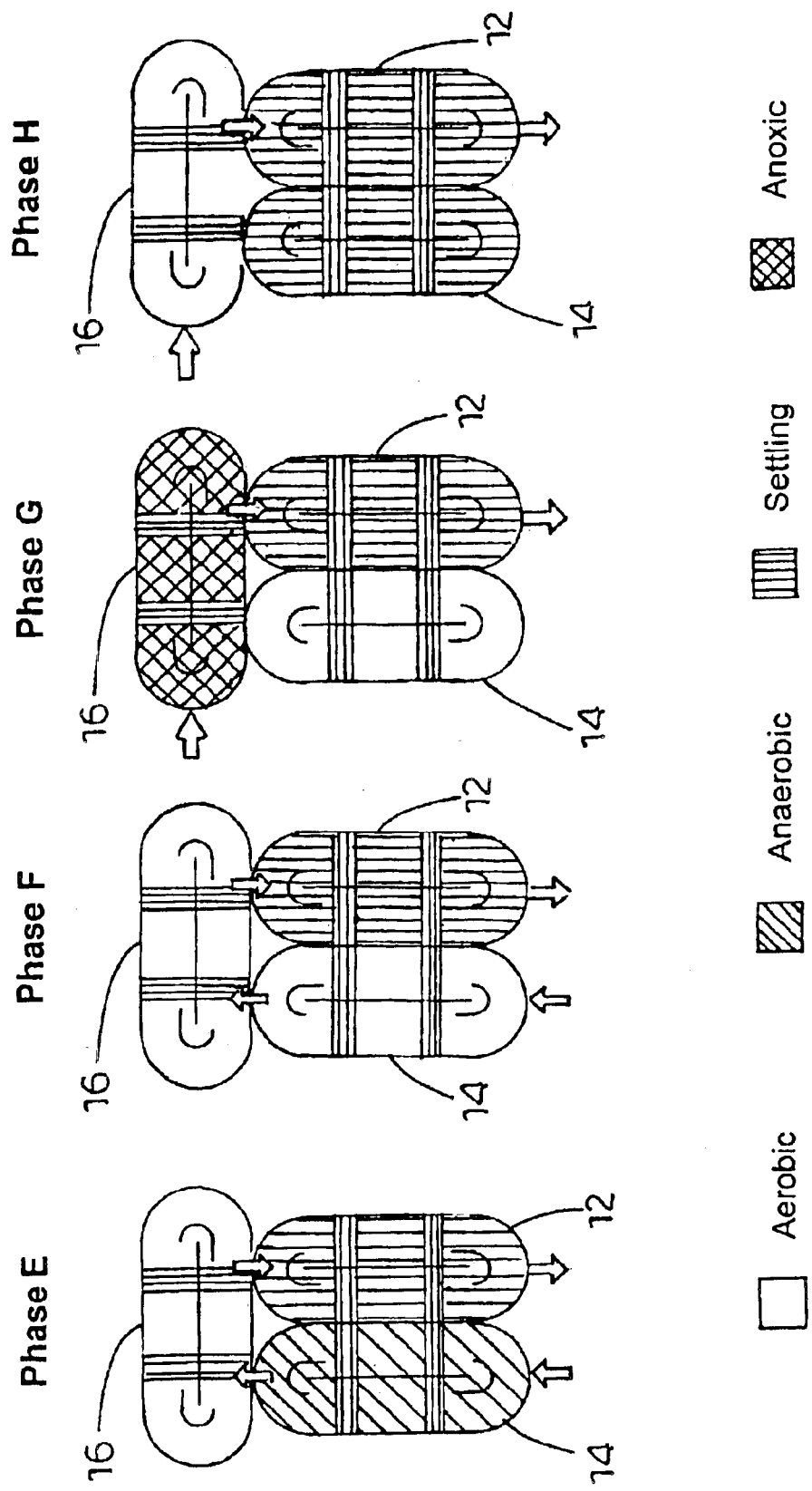

Turning to FIGS. 3A and 3B, there is shown therein a schematic illustration of a biological wastewater treatment process similar to that shown in FIG. 2 and described above but wherein there is interposed within the process two phases that will give rise to denitrification of the wastewater. In FIGS. 3A and 3B the two new phases are phases C and G. The remaining phases A, B, D, E, F and H correspond to the phases shown in FIG. 2 and as discussed above perform phosphorus removal as well as nitrification. In phase C, which follows phase B in FIG. 3A, the mixed liquor in intermediate basin 16 is now maintained under anoxic conditions as contrasted to the aerobic conditions of phase B. As will be appreciated by those skilled in the art, when the mixed liquor is subjected to anoxic conditions, microorganisms within the biomass utilize the oxygen associated with the nitrites and nitrates causing the $NO_x$ to be converted to elemental nitrogen. Consequently, denitrification occurs. In phase C, the effluent weirs are adjusted such that the mixed liquor of intermediate basin 16 is directed to the outer basin 14 which is maintained in an aerobic mode. The other outer basin 12 is also maintained in a settling mode, but without the discharge of any purified effluent. Again, the purified effluent is discharged from the other outer basin 14.

Further during the process, between phases F and H, an additional anoxic phase is interposed. See FIG. 3B. This is phase G. Phase G is similar to phase C except that the effluent weirs are adjusted such that the mixed liquor effluent from intermediate basin 16 is directed into outer basin 12 which is in a settling mode and produces a purified effluent. The other outer basin, basin 14, remains in an aerobic mode but does not produce a purified effluent. Again, the anoxic treatment zone provided for in basin 16 denitrifies the mixed liquor by converting the $NO_x$ to elemental nitrogen.

It should be pointed out that with respect to the anoxic phases C and G, these phases are preceded with aerobic phases. That is, intermediate basin 16 in phases B and F is maintained under aerobic conditions. This, as will be understood by those skilled in the art, performs a nitrifying function. That is, microorganisms in phases B and F convert ammonia nitrogen, under aerobic conditions, to nitrates and nitrites.

Because of the network of piping illustrated in FIG. 1, mixed liquor suspended solids or biomass can be transferred from one basin to another basin in order to enhance the efficiency and effectiveness of the overall process. For example, during certain portions of the processes discussed above, mixed liquor suspended solids can be transferred from the outer basins 12 and 14 to the intermediate basin 16. This may be particularly advantageous, for example, when the two outer basins 12 and 14 are in settling modes and the intermediate basin is being operated under aerobic conditions. In some operations, the mixed liquor suspended solids concentration in the intermediate basin 16 is less than 50% of that in the two other basins. Therefore, by transferring mixed liquor suspended solids from certain basins to one or more other basins, then the mixed liquor suspended solid concentration can be balanced among the basins, and sometimes, if appropriate, can be intentionally increased in one or more basins to make the overall process more efficient and effective. Also, biomass can be transferred from a settling outer basin to another outer basin that is operating under anaerobic conditions. This will, of course, enhance the proliferation or growth of the phosphorus-storing microorganisms.

Also, as noted above, the intermediate basin 16 utilized in the processes of FIGS. 2, 3A and 3B, can be increased in size to where the intermediate basin is designed for up to 50% of the overall system volume. This will tend to maximize the active volume for biological reactions, especially nitrification and other biological reactions that require aerobic conditions.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A multi-phase process for the removal of phosphorus from a wastewater influent stream in a triple basin wastewater treatment facility having first, second and third basins wherein during the course of the multi-phase process a settling phase is carried out in at least two of the three basins, the process comprising:
    a. during the multi-phase process, directing the wastewater influent stream into each of the three basins during three different phases of the process to form mixed liquor;
    b. during the multi-phase process, maintaining at least two of the three basins under anaerobic conditions, one basin being maintained under anaerobic conditions during one phase and another basin being maintained under anaerobic conditions during another phase;
    c. maintaining at least one of the three basins under aerobic conditions during selected phases of the process;
    d. during each of the phases of the process, maintaining at least one of the basins in a settling mode, and wherein during the course of the multi-phase process at least two of the three basins are used for settling; and
    e. wherein maintaining the basins under anaerobic conditions give rise to the growth of phosphorus storing microorganisms and wherein the phosphorus storage microorganisms take up phosphorus in the basins maintained under aerobic conditions.

2. The process of claim 1 wherein the process includes at least six phases and wherein during two phases the wastewater influent is initially directed into basins being maintained under anaerobic conditions, and wherein during two other phases the wastewater influent stream is initially directed into basins being maintained under aerobic conditions.

3. The process of claim 1 wherein the three basins include first and second outer basins and an intermediate basin, and wherein the process includes pumping the mixed liquor from one or both of the outer basins to the intermediate basin.

4. The process of claim 1 wherein the three basins include first and second outer basins and an intermediate basin, and wherein during at least one phase of the process wastewater influent is directed into the first outer basin and effluent from the first outer basin is directed to the intermediate basin and effluent from the intermediate basin is directed to the second outer basin; and wherein during another phase of the process, the wastewater influent is directed into the second outer basin and the effluent of the second outer basin is directed to the intermediate basin and effluent from the intermediate basin is directed to the first outer basin.

5. The process of claim 4 wherein the first and second outer basins assume a settling mode during certain phases of the process.

6. The process of claim 4 including at least one process phase where the wastewater influent is directed into the intermediate basin and wherein the effluent from the intermediate basin is directed to one of the first or second outer basins which assumes a settling mode.

7. The process of claim 1 wherein the process includes at least one anoxic phase wherein the mixed liquor in at least one of the basins is maintained under anoxic conditions.

8. The process of claim 1 wherein during at least one phase of the process the mixed liquor in the intermediate basin is maintained under anoxic conditions so as to perform a denitrifying function.

9. The process of claim 1 wherein the three basins include first and second outer basins and an intermediate basin, wherein the process includes at least six phases:
    a. a first phase wherein influent wastewater is directed into a first outer basin maintained under anaerobic conditions and wherein effluent from the first outer basin is directed to the intermediate basin where the mixed liquor therein is maintained under aerobic conditions and wherein the effluent from the intermediate basin is directed to the second outer basin which is maintained in a settling mode;

b. a second phase like the first phase except that the mixed liquor of the first outer basin is maintained under aerobic conditions;

c. a third phase where influent wastewater is directed into the intermediate basin and the mixed liquor of the intermediate basin is maintained under aerobic conditions, and wherein the effluent of the intermediate basin is directed to the second outer basin where mixed liquor therein along with the mixed liquor in the first outer basin is maintained in a settling mode;

d. a fourth phase wherein wastewater influent is directed into the second outer basin which is maintained under anaerobic conditions and wherein the effluent of the second outer basin is directed to the intermediate basin which is maintained under aerobic conditions and wherein the mixed liquor of the intermediate basin is directed to the first outer basin which is maintained in a settling mode;

e. a fifth phase like the fourth phase with the exception that the second outer basin is maintained under aerobic conditions; and f. a sixth phase where wastewater influent is directed into the intermediate basin which is maintained under aerobic conditions and wherein the effluent of the intermediate basin is directed to the first outer basin where the mixed liquor therein along with the mixed liquor in the second outer basin is maintained in a settling mode.

10. The process of claim 9 including transferring mixed liquor suspended solids from either or both of the first and second outer basins to the intermediate basin.

11. The process of claim 9 wherein the volume of the intermediate basin exceeds the volume of either the first or second outer basin.

12. The process of claim 11 wherein the intermediate basin constitutes 35% to 50% of the total volume of all three basins.

13. The process of claim 9 including at least one additional anoxic phase where wastewater influent is directed into the intermediate basin and the mixed liquor in the intermediate basin is maintained under anoxic conditions, and wherein the mixed liquor effluent from the intermediate basin is directed to one of the first or second outer basins which is maintained in a settling mode.

14. The process of claim 13 wherein the process includes two anoxic phases.

15. The process of claim 1 wherein one basin at a time is maintained under anaerobic conditions.

16. The process of claim 1 including, during one or more phases of the process, increasing the concentration of mixed liquor suspended solids in a basin maintained under anaerobic conditions by transferring mixed liquor suspended solids from a basin maintained in a settling mode to the basin maintained under anaerobic conditions.

17. A process for removing phosphorus from wastewater in a triple basin system having first and second outer basins and an intermediate basin, comprising:

a. in one phase of treatment, directing wastewater influent into a first outer basin and mixing the wastewater with activated sludge to form mixed liquor and maintaining the mixed liquor in the first outer basin under anaerobic conditions;

b. directing the effluent from the first outer basin to the intermediate basin, and maintaining the mixed liquor in the intermediate basin under aerobic conditions;

c. directing the effluent from the intermediate basin to the second outer basin and maintaining the second outer basin in a settling mode so as to separate activated sludge from treated effluent;

d. in another phase of treatment, changing the treatment conditions in the first outer basin from anaerobic to aerobic, and directing the mixed liquor effluent from the first outer basin to the intermediate basin and directing the effluent from the intermediate basin to the second outer basin;

e. in another phase of treatment, switching the wastewater influent from being directed into the first outer basin to being directed into the intermediate basin, and maintaining the mixed liquor in the intermediate basin under aerobic conditions and transferring the mixed liquor effluent from the intermediate basin to at least one of the first or second basins while maintaining the first and second outer basins in a settling mode; and f. wherein the anaerobic treatment of the mixed liquor gives rise to the growth of phosphorus storage microorganisms and wherein the phosphorus storage microorganisms take up phosphorus when exposed to aerobic conditions.

18. The process of claim 17 further including a. in another phase of treatment, directing the wastewater influent into the second outer basin and mixing the wastewater with activated sludge to form mixed liquor and maintaining the mixed liquor in the second outer basin under anaerobic conditions;

b. while the second outer basin is being maintained under anaerobic conditions, directing mixed liquor effluent from the second outer basin to the intermediate basin and maintaining the mixed liquor in the intermediate basin under aerobic conditions while directing the mixed liquor effluent from the intermediate basin to the first outer basin and maintaining the first outer basin in a settling mode;

c. in another phase of treatment, changing the conditions in the second outer basin to where the mixed liquor therein is maintained under aerobic conditions while the effluent from the second outer basin is directed to the intermediate basin and the effluent of the intermediate basin is directed to the first outer basin which remains in a settling mode; and d. in another phase of treatment, switching the wastewater influent from the second outer basin to the intermediate basin and maintaining the mixed liquor in the intermediate basin under aerobic conditions and transferring the mixed liquor effluent from the intermediate basin to at least one of the first or second outer basins while maintaining the first and second outer basins in a settling mode.

19. The process of claim 17 including increasing the concentration of mixed liquor suspended solids in the intermediate basin by transferring mixed liquor suspended solids from the first or second outer basins to the intermediate basin.

20. The process of claim 17 wherein the volume of the intermediate basin exceeds the volume of the first or second outer basins.

21. The process of claim 20 wherein the volume of the intermediate basin constitutes approximately 35% to 50% of the total volume of all three basins.

22. The process of claim 17 including transferring a portion of the mixed liquor suspended solids from one of the outer basins being maintained in a settling mode to the other outer basin being operated under anaerobic conditions.

* * * * *